United States Patent

[11] 3,585,273

| | | |
|---|---|---|
| [72] | Inventor | Arloe W. Paul<br>Milwaukee, Wis. |
| [21] | Appl. No. | 824,411 |
| [22] | Filed | May 14, 1969 |
| [45] | Patented | June 15, 1971 |
| [73] | Assignee | Allen-Bradley Company<br>Milwaukee, Wis. |

[54] ENCLOSURE FOR ELECTRICAL APPARATUS IN HAZARDOUS LOCATIONS
1 Claim, 4 Drawing Figs.

[52] U.S. Cl.................................................. 174/65R,
174/50, 220/3.2
[51] Int. Cl...................................................... H05k 5/04
[50] Field of Search........................................... 174/DIG. 2,
65, 76, 77, 50; 220/60, 3.2

[56] References Cited
UNITED STATES PATENTS
3,335,270  8/1967  Rongey et al.................  174/BAL.

*Primary Examiner*—Darrell L. Clay
*Attorneys*—Thomas O. Koehn and Arthur H. Seidel

ABSTRACT: The base member of an electrical apparatus enclosure is adapted for mounting to a vertical surface. Electrical conductors enter the enclosure through flasks integrally molded with the base member at the top and bottom. Each flask has a threaded exterior opening for receiving an electrical conduit, an interior opening inside of the enclosure, and a cavity formed between those openings to receive a sealer for sealing the interior of the conduit. The upper flasks are filled with the sealer through filling tubes, and the lower flasks are filled through the interior openings.

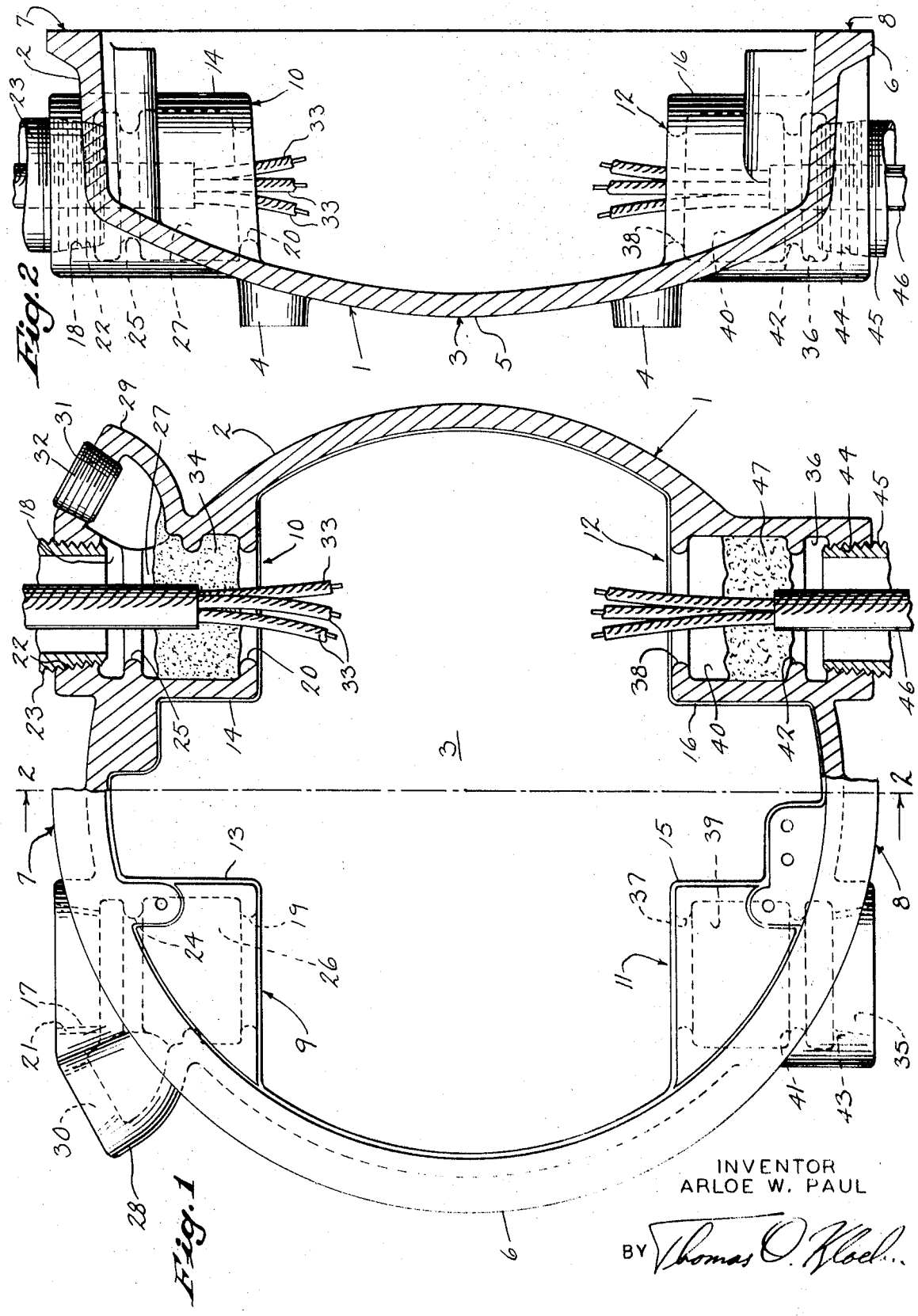

INVENTOR
ARLOE W. PAUL

BY Thomas O. Kloehn

ATTORNEY

ENCLOSURE FOR ELECTRICAL APPARATUS IN HAZARDOUS LOCATIONS

BACKGROUND OF THE INVENTION

Electrical conduits carrying conductors to electrical apparatus mounted in hazardous atmospheres must be sealed from the hazardous atmospheres, lest the interiors of the conduits become dangerously contaminated. Generally, special cast iron, Y-shaped fittings have been used to form seals for the conduits. The industrial electrical regulations and standards require that these cast iron fittings be turned on to the end of the conduit within 18 inches of the apparatus enclosure. A nipple extension may be used to join the fitting, which is mounted on the end of the conduit, to the enclosure, and to convey the electrical conductors from the fitting to the enclosure. One of the two upper branches of such Y-shaped fittings usually has a reduced diameter and a plug is screw fitted into it to close it. The other adjacent upper branch has a larger diameter to fit the conduit or the nipple. The lower branch, which is opposite the upper two, is also of a size to fit the conduit or nipple. The plug in the smaller upper branch of the Y-shaped fitting is removed to pack a fibrous filling and sealing compound into the fitting to seal off the end of the conduit about the conductors. These fittings are made of cast iron so that if the enclosure is to be moved to a different location, the fitting can be broken with a hammer.

Though these sealing fittings satisfy the electrical standards for effecting the necessary seal of the interior of the conduit, they are not without problems. In the first place, the fitting occupies considerable space and requires still more space for installation, none of which may be available in cramped quarters. Also, the fittings are sometimes more expensive than the smaller apparatus enclosures, and the fittings are costly enough to add substantially to the cost of any installation. Hence, if the fitting can be eliminated, considerable expense and space can be saved, the number of joints in the conduit can be minimized, and installation labor reduced.

SUMMARY OF THE INVENTION

The present invention relates to enclosure for electrical apparatus in hazardous locations, and more specifically it relates to the incorporation in the walls of the enclosure a flask which has an external opening adapted to be connected with and sealed to a conduit and an internal opening inside of the enclosure, with a cavity between the external and internal openings that is adapted to receive a sealing compound to seal off the conduit.

By the foregoing combination in the enclosure itself, the need for an extra fitting to seal the conduit in a hazardous location is eliminated. This vastly reduces the space required for the installation of the electrical apparatus enclosure and it eliminates one comparatively costly element found in prior art installations, to wit: the extra fitting. The present invention also minimizes the number of joints in the conduit run, eliminates the labor necessarily involved in the installation of an extra fitting, and makes the apparatus generally easier to install. The filling and sealing compound can be introduced from the inside of the electrical apparatus enclosure, or it can be introduced externally through a filling tube. The overall installation in the hazardous location becomes much more compact, and a great deal neater and cleaner in appearance.

BRIEF DESCRIPTION OF THE DRAWINGS

In the drawings:

FIG. 1 is an end elevation, partially in section, of a base member of a switch enclosure embodying the present invention, FIG. 2 is a side elevation in section of the base section of the switch enclosure shown in FIG. 1 taken along the plane 2-2 in FIG. 1.

DESCRIPTION OF THE PREFERRED EMBODIMENT

Figure 3:
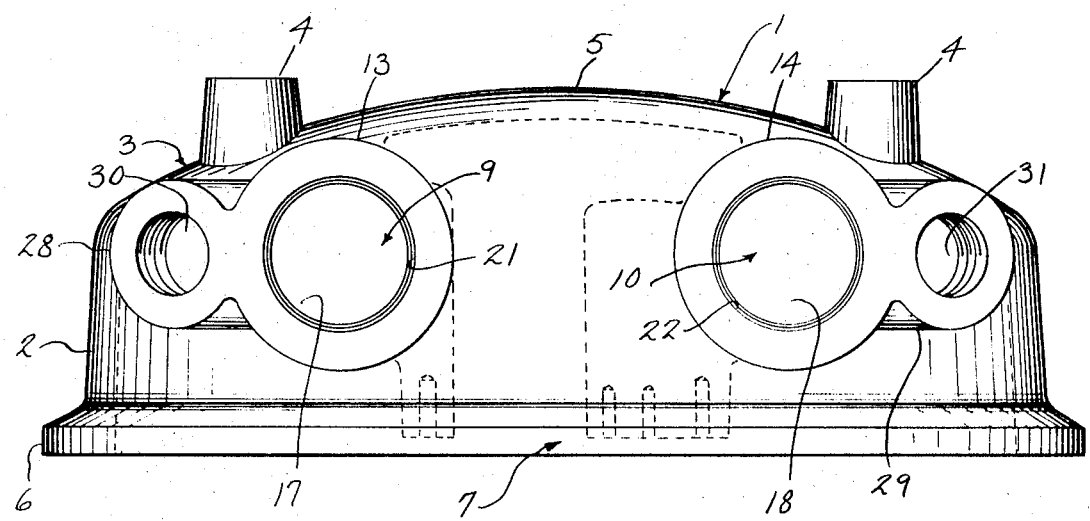
FIG. 3 is a top view of the base member of a switch enclosure shown in FIGS. 1 and 2.
Figure 4:
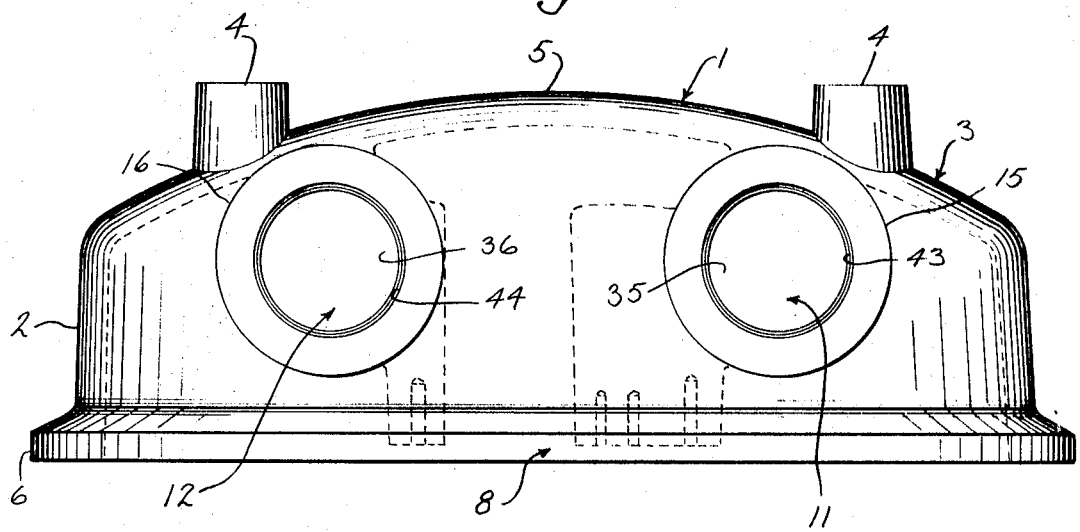
FIG. 4 is a bottom view of the base member of the switch enclosure shown in FIGS. 1-3.

The drawings illustrate a base member 1 of a switch enclosure, which is disclosed in its entirety in the copending application of DeSmidt and Kuhn entitled "Electrical Apparatus for Hazardous Locations,", filed on March 10, 1969, Ser. No. 805,535 and assigned to the assignee of the present application. For the structure of the portions of the enclosure not shown here and the methods of assembling and sealing the enclosure itself, reference should be had to that application. For purposes of describing the illustrated embodiment of the invention, it is sufficient to show only the base member 1.

The base member 1 is a single, integrally cast member having a cylindrical lateral wall 2 and a dished base end 3 defining a hollow interior. Four mounting legs 4 project from the dished base end 3 and are adapted to be bolted to a vertical mounting panel or wall. The mounting legs 4 are long enough to provide a clearance for the crown 5 of the dished base end 3. The base member 1 opens outwardly and has an annular flange 6 that fans radially outwardly about the open end of the cylindrical lateral wall 2, and this flange 6 cooperates with a corresponding flange (not shown) on a cover portion (not shown) to mount the cover portion onto the base member 1 and to form a seal that is disclosed in detail in the mentioned copending application.

When mounted on the vertical panel, the base member 1 has an upper side 7 and a lower side 8, and the upper and lower sides 7 and 8, respectively, have two passages 9, 10 and 11, 12 for electrical conductors extending between the apparatus (not shown) on the inside of the enclosure to the line or other apparatus (not shown) outside of the enclosure. In the prior art, these passage ways would be simple, internally threaded holes adapted to receive a threaded conduit, or nipple. However, according to the present invention the passage ways extend through the center of four, open-ended flasks 13, 14 and 15, 16, respectively.

The flasks 13—16 are integrally molded with the base member 1 so that they are mounted in and extend through the cylindrical lateral walls 2, and, in part, through the edge of the dished base end 3. The flasks 13 and 14 on the upper side 7 of the base 1 are mirror images of one another, in that one (13) appears left handed and the other (14) appears right handed. Each flask 13 and 14 has an external opening 17 and 18, respectively, to the exterior of the base member 1 of the enclosure, and an internal opening 19 and 20, respectively, to the hollow interior of the base member 1 of the enclosure. The external openings 17 and 18 have internal, tapered threads 21 and 22, respectively, to receive the ends of conduit 23, only one of which is shown. Inwardly projecting annular ridges 24 and 25, respectively, in the flasks 13 and 14 define the top ends of enlarged cavities 26 and 27, respectively, in the flasks 13 and 14, the lower ends of which terminate in the internal openings 19 and 20. Filling tubes 28 and 29, respectively, which have internally threaded openings 30 and 31 adjacent to the respective external openings 17 and 18 of the flasks 13 and 14, empty into the cavities 26, 27, in the respective flasks 13 and 14. Plugs 32, only one of which is shown, are screw fitted into the openings 30 and 31 of the filling tubes 28 and 29. Electrical conductors 33 from the inside of the conduit 23 extend through the cavity 27 and the internal opening 20 of the flask 14 into the hollow interior of the base member 1. A fibrous filling and sealing compound 34, which is one of the well-known commercial products used for this purpose, is introduced into the cavity 27 in the flask 14 through the filling tube 29 after the conduit 23 has been turned into the external opening and the electrical conductors 33 have been entered through the passage 10 into the hollow interior of the base member 1. Thus, the sealing compound 34 forms a tight seal about the electrical conductor 33 and across the cavity 27 to seal the end of the conduit 23.

The flasks 15 and 16 about the conductor passages 11 and 12 on the lower side 8 of the base member 1 are also identical to each other, but they differ from the flasks 13 and 14 described above on the top side 7 of the base member 1. The flasks 15 and 16 on the lower side 8 of the base member have external openings 35 and 36, respectively, and internal openings 37 and 38, respectively. Between the respective external openings 35 and 36 and internal openings 37 and 38 enlarge cavities 39 and 49 are formed, and the bottom ends of the cavities 39 and 40 are defined by respective radially inwardly extending annular ridges 41 and 42 adjacent to the external openings 35 and 36. The external openings 35 and 36 have tapered interior threads 43 and 44 to receive a threaded end of a conduit 45, only one of which is shown, and conductors 46 within the conduit 45 pass from the conduit 45 through the flask 16 into the hollow interior of the base member 1. After the conduit 45 has been turned into the tapered thread 44 of the external opening 36 in the flask 16 and the electrical conductor 46 has been pulled into the interior of the base member 1, a filling and sealing compound 47, which is one of the well-known products marketed for this purpose, is introduced into the enlarged cavity 40 to fill the cavity 40 and form a tight seal about the electrical conductors 46. In the case of the lower flasks 15 and 16, the sealing compound 47 is introduced through the internal openings 37 and 38, thus obviating the need for filling tubes, such as the filling tubes 28 and 29 that form a part of the upper flasks 13 and 14.

After the base member 1 according to the present invention has been mounted on its legs 4 on a vertical panel or wall, conduits 23 and 45 are turned tightly into the threaded exterior openings 17, 18, 35 and 36, and the electrical conductors 33 and 46 are drawn into the hollow interior of the base member 1. The plugs 32 are removed from the external openings 30 and 31 of the filling tubes 28 and 29, respectively, and filler and sealing compound 34 is packed into the cavities 26 and 27, respectively, through the filling tubes 28 and 29. Then the plugs 32 are tightened back in place and the seal for the conduits 23 is completed. Meanwhile, filler sealing compound 47 is also packed into the lower flasks 15 and 16 through the respective interior openings 37 and 38, filling the cavities 39 and 40, to seal the interior of the conduits 45. Of course, the appropriate electrical connections to the apparatus (not shown) inside of the enclosure may be made, the cover (not shown) assembled onto the base member 1 and sealed, completing the enclosure.

Manifestly, an enclosure could have more or fewer conductor passage ways with flasks, such as the passage ways 9—12 and the flasks 13—16. Also, enclosures that differ from the switch enclosure shown in the embodiment described here may embody the invention. For example, another enclosure embodying the invention might be a relatively small and simple housing with only one passage way for conductors, and it could have a rectangular shape. Similarly, the passage ways for the conductors may extend out the sides or ends rather than out of the top or bottom as is described in the preferred embodiment. Instead of forming the flasks as an integral part of the enclosure wall, such flasks could be separate members that are screw mounted, for example, in the enclosure wall. The enclosures of different varieties are assembled in different manners from that disclosed in the preferred embodiment.

Whatever the embodiment, it will manifest the objects and advantages of this invention. By employing the present invention, space will be saved. Also, two joints necessitated by the prior art use of a separate fitting will be eliminated from each conduit, along with the labor involved in making those joints. Casting the flasks 13—16 as an integral part of the base member 1 adds negligible cost to the member 1, whereas the use of four additional fittings might add a total cost greater than the cost of the entire base member 1. Even if the flasks are not integrally formed with the enclosure, factory assembly will save substantial cost. If the flasks 13—16 are made as integral parts of the enclosure wall, such embodiments of the present invention will be particularly advantageous for use in permanent installations. The conduit seals according to the present invention are protected by the enclosure wall from damage that could occur from separate, exposed fittings such as the prior art employs. In the case of smaller and less expensive enclosures, the present invention is also better suited to temporary installations than is the prior art, since the enclosure itself might cost less than the fitting employed by the prior art and hence it would be cheaper to destroy a prior art fitting and save the less expensive enclosure.

The foregoing and other objects and advantages of the present invention will be apparent to those skilled in the art as will the manifold embodiments of the invention. The embodiment disclosed, as distinguished from the invention itself, is the best method presently contemplated by the inventor for carrying out his invention, and that which the inventor considers to be the invention itself is set forth in the claim that follows.

I claim:

1. An enclosure member for electrical apparatus in hazardous atmospheres comprising the combination of a closed base end and an external lateral wall encircling the base end that together define a hollow interior;

a hollow upper flask integrally molded with and protruding both inwardly and outwardly from said lateral wall having an external opening internally threaded to receive an electrical conduit, and internal opening communicating with said hollow interior of said enclosure member, and enlarged cavity between said exterior opening and said interior opening that is defined by an internal ridge spaced below said threaded external opening to receive a sealing compound for sealing said conduit from said hollow interior of said enclosure member, and having an externally opening filling tube with an exterior opening adjacent said exterior opening of said flask internally threaded to receive a plug and communicating with said enlarged hollow cavity;

and a hollow lower flask integrally molded with and protruding both inwardly and outwardly from said lateral wall of said enclosure member, having an internally threaded exterior opening adapted to receive an electrical conduit, an interior opening communicating with said hollow interior of said enclosure member, and an enlarged cavity that is defined by an internal ridge spaced above said threaded external opening communicating between said exterior opening and said interior opening to receive sealing compound to seal said conduit from said hollow interior of said enclosure member.

PO-1050
(5/69)

UNITED STATES PATENT OFFICE
CERTIFICATE OF CORRECTION

Patent No. 3,585,273　　　　　　　　　Dated June 15, 1971

Inventor(s) Arloe W. Paul

It is certified that error appears in the above-identified patent and that said Letters Patent are hereby corrected as shown below:

Column 1, line 42, after "to" insert ---an---

Column 3, line 9, "large" should read ---larged---; "49" should read ---40---

Column 4, line 21, after "destroy" insert ---the enclosure to move the installation than it would be to destroy---

Column 4, line 39, "and" should read ---an---

Column 4, line 40, "and" should read ---an---

Signed and sealed this 16th day of November 1971.

(SEAL)
Attest:

EDWARD M. FLETCHER, JR.　　　　ROBERT GOTTSCHALK
Attesting Officer　　　　　　　　Acting Commissioner of Patents